US006658442B1

(12) United States Patent
Pomet (10) Patent No.: US 6,658,442 B1
(45) Date of Patent: Dec. 2, 2003

(54) DEVICE AND METHOD FOR THE IMPLEMENTATION OF AN ELEMENTARY MODULAR OPERATION ACCORDING TO THE MONTGOMERY METHOD

(75) Inventor: Alain Pomet, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/526,228

(22) Filed: Mar. 15, 2000

(30) Foreign Application Priority Data

Mar. 17, 1999 (FR) ............................................ 99 03409

(51) Int. Cl.[7] ................................................ G06F 7/38
(52) U.S. Cl. ........................................................ 708/491
(58) Field of Search .............................. 708/491, 492, 708/250, 523, 781, 530; 714/781; 380/30

(56) References Cited

U.S. PATENT DOCUMENTS

| 5,124,572 | A | * | 6/1992 | Mason et al. ............... 327/145 |
| 5,513,133 | A | * | 4/1996 | Cressel et al. .............. 708/491 |
| 5,572,714 | A | * | 11/1996 | Nakakura ................... 713/500 |
| 5,745,398 | A | * | 4/1998 | Monier ........................ 708/491 |
| 5,764,554 | A | * | 6/1998 | Monier ........................ 708/492 |
| 5,787,488 | A | * | 7/1998 | Garde .......................... 711/169 |
| 6,035,317 | A | * | 3/2000 | Guy ............................. 708/492 |
| 6,185,596 | B1 | * | 2/2001 | Hadad et al. ............... 708/491 |
| 6,237,015 | B1 | * | 5/2001 | Monier ........................ 708/492 |
| 6,341,299 | B1 | * | 1/2002 | Romain ....................... 380/30 |
| 6,424,987 | B1 | * | 7/2002 | Romain ....................... 708/491 |

FOREIGN PATENT DOCUMENTS

| EP | 0 566 498 A2 | 4/1993 |
| JP | 363201789 A | * 8/1988 |
| WO | WO 98/50851 | 11/1998 |

OTHER PUBLICATIONS

Arazi, Benjamin "On Primality Testing Using Purely Divisionless Operations", Computer Journal, vol. 37, No. 2, 1994, XP000448174, pp. 219–222.
French Search Report dated Jan. 26, 2000 with Annex to French Application No. 99–03409.

* cited by examiner

Primary Examiner—Chuong Dinh Ngo
Assistant Examiner—Chat Do
(74) Attorney, Agent, or Firm—Lisa K. Jorgenson; Jose Gutman; Fleit, Kain, Gibbons, Gutman, Bongini & Bianco P.L.

(57) ABSTRACT

A coprocessor (200) is proposed, using a single multiplication circuit (228 and 231) coupled to a computation circuit (240) dedicated to the computation of $Y_0$, with $Y_0 = (X^* J_0)$ mod $2^k$, $J_0$ being defined by the equation $((N^* J_0)+1)$ mod $2^k = 0$. The computation of $Y_0$ is done bit by bit, during one half-cycle of a clock signal before the use of each bit. A method is also proposed for the computation of a modular operation using the circuit (240) for the computation of $Y_0$.

10 Claims, 4 Drawing Sheets

FIG_1 Prior Art

FIG_2

FIG_3

FIG_4

FIG_5

FIG_6

FIG_7

DEVICE AND METHOD FOR THE IMPLEMENTATION OF AN ELEMENTARY MODULAR OPERATION ACCORDING TO THE MONTGOMERY METHOD

CROSS-REFERENCE TO RELATED APPLICATIONS

This application is based upon and claims priority from prior French Patent Application No. 99-03409, filed Mar. 17, 1999, the entire disclosure of which is herein incorporated by reference.

BACKGROUND OF THE INVENTION

1. Field of the Invention

The present invention generally relates to a device and method for the implementation of an elementary modular operation according to the Montgomery method. This method can be used to perform modular computations in a finite field (or Galois field) without performing divisions.

Conventionally, modular operations in finite fields are used in cryptography for applications such as the authentication of messages, and the identification of a user or the exchange of keys. Exemplary applications of this kind are described for example in patent application FR-A-2 679 054 (hereinafter D1).

2. Description of Related Art

There are commercially available integrated circuits that are generally dedicated to such applications, for example the product manufactured by STMicroelectronics S.A. referenced ST16CF54 built around an association of the type comprising a central processing unit and an arithmetic coprocessor and generally dedicated to the implementation of modular computations. The coprocessor used enables the processing of the operations of modular multiplication by using the Montgomery method. It is the object of the patent application EP-A-0 601 907 (hereinafter D2).

The basic operation, called a Pfield operation, consists of the use of three binary data elements, A (multiplicand), B (multiplier lower than N) and N (modulo), encoded on an integer number n of bits, to produce a binary data element referenced $P(A, B)_N$ encoded on n bits such that $P(A, B)_N = A*B*I \mod N$, with $I = 2^{-n} \mod N$. For this purpose, it is assumed that the data elements are encoded on m words of k bits with m and k as integers such that $m*k=n$, and the words A and B are given to a multiplication circuit having a serial input, a parallel input and a series output.

Figure 1:
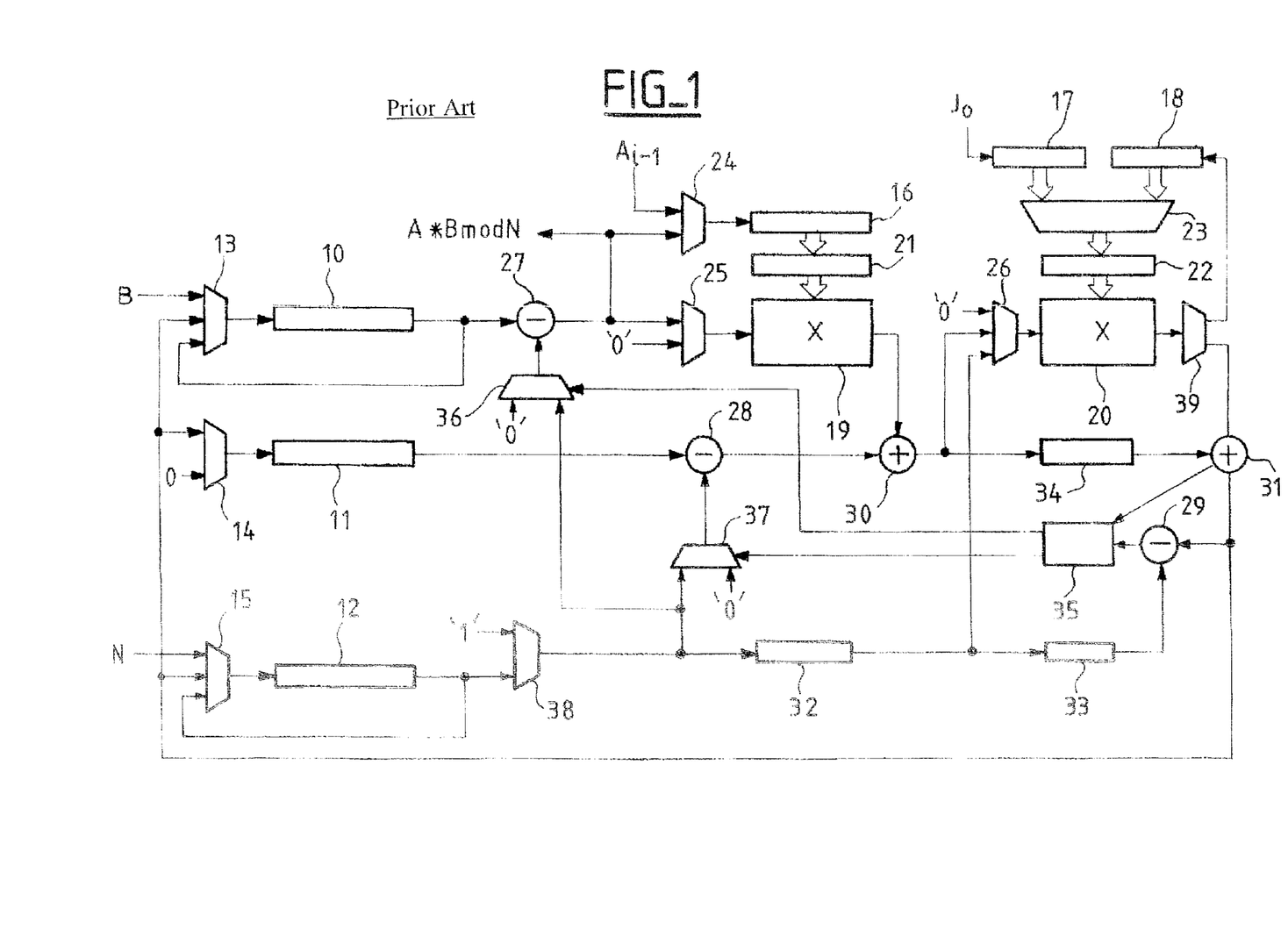
FIG. 1 shows a modular arithmetic coprocessor according to the prior art.

For the coprocessor described in D2, we have $k=32$ and $m=8$ or 16. FIG. 1 shows the modular arithmetic coprocessor disclosed by D2. This coprocessor comprises the following elements: three shift registers 10, 11 and 12, with $m*k$ bits, designed to receive respectively the multiplier B, the result S and the modulo N, multiplexers 13 to 15 that are respectively connected to the inputs of the registers 10 to 12, three k-bit shift registers 16, 17 and 18 having one series input and one parallel output, designed to receive respectively k bits of the multiplicand A, a computation parameter referenced $J_0$, an intermediate result referenced $Y_0$, two multiplication circuits 19 and 20 each having one series input, one parallel k-bit input and one series output, two k-bit parallel latches 21 and 22 used as a buffer for the multiplication circuits 19 and 20, a multiplexer 23 used to connect the latch 22 either to the register 17 or to the register 18, three multiplexers 24, 25 and 26 used to route the data elements to the inputs of the multiplication circuits 19 and 20, three subtraction circuits 27, 28 and 29 each comprising two series inputs and one series output, two addition circuits 30 and 31, each having two series inputs and one series output, three delay cells 32, 33 and 34 that are actually k-bit shift registers, and are used to delay the data elements by k clock cycles to mask the computation time of the multiplication circuits 19 and 20, a comparison circuit 35, two multiplexers 36 and 37 used to control the subtraction circuits 27 and 28, a multiplexer 38, and a demultiplexer 39.

For further details on the making of these elements, reference may be made to D2.

To perform an elementary operation called a Pfield operation of the $P_{Field}(A, B)_N = A*B*I \mod N$ type, A and B being encoded on a number m of k-bit words and I being an error equal to $2^{-m*k}$, the iteration of the next loop is performed m times with i being an index varying from 0 to m−1:

$X = S(i-1) + A_i*B$, $Y_0 = (X*J_0) \mod 2^k$, $Z = X + (N*Y_0)$ $S(i) = Z2^k$, being an integer division, if $S(i)$ is greater than N, then N is subtracted from $S(i)$ before the next iteration, with $S(-1)=0$, $A_i$ being the ith k-bit word of A, $J_0$ being a k-bit word defined by the equation $((N*J_0)+1) \mod 2^k = 0$.

The coprocessor of FIG. 1 enables the performance of a full iteration by a simultaneous shift, by $m*k$ bits, of the registers 10 to 12 respectively containing B, $S(i-1)$ and N followed by a shift, by $2*k$ bits, of the register 12 to store $S(i)$, the word $A_i$ being loaded into the register 21 and the word $J_0$ being loaded into the register 17. To perform the full computation of $P_{Field}(A, B)_N$, it is enough to repeat each iteration m times by changing the word $A_i$ contained in the register 21 during each iteration.

The operation "$X = S(i-1) + A*B$" is done by means of the multiplication circuit 19 and the addition circuit 30. The operation "$Y_0 = (X*J_0) \mod 2^k$" is done, during the k first shifts, in the multiplication circuit 20, in taking care to store $J_0$ in the register 22, the result $Y_0$ being stored in the register 18. The operation "$Z = X + (N+Y_0)$", N and X having been delayed by k bits in the delay cells 32 and 34 and $Y_0$ having been put into the register 22, is performed by means of the multiplication circuit 20 and the addition circuit 31. The operation "$S(i) = Z2^k$" is done by a k-bit shift. The comparison of $S(i)$ with N is done by the subtraction of N from $S(i)$ in the subtraction circuit 29, N being delayed by k bits in the cell 33, a possible overflow being detected and stored in the comparison circuit 35 to find out the result of the comparison. The subtraction of N from $S(i)$ is done during the next iteration in the subtraction circuit 28.

Many improvements have been made in this circuit. The improvements are aimed at obtaining higher speeds and/or reducing the size of the circuit and/or reducing the consumption of the circuit and/or providing additional functions without considerably increasing the size of the circuit. Those skilled in the art may refer, inter alia, to the publications of the European patent applications EP-0 712 070, EP-0 712 071, EP-0 712 072, EP-0 778 518, EP-0 784 262, EP-0 785 502, EP-0 785 503, EP-0 793 165, EP-0 853 275, and also to the publication of the international patent application WO/97 25668.

There is also another circuit known from the publication of the European patent application EP-0 566 498 (hereinafter D3) enabling the computation of the elementary operation $P(A, B)_N = A*B*I \mod N$, with $I = 2^{-n}$ and n being the size of A, B or N. The circuit of D3 uses a single parallel/series multiplication circuit, represented in D3 in the form of a parallel adder coupled with a shift register. The circuit of D3 does not reproduce exactly the Montgomery algorithm and uses an intermediate data element equal to $(N-1)/2+1$. The circuit of D3 uses a multiplication circuit having an n-bit parallel input and is limited to computation operands with a permanently fixed size. Furthermore, the size of the circuit of D3 is proportional to the size of the operands used, the surface area thus occupied being considerable.

The present invention is aimed at improving the prior art by proposing a coprocessor that uses a single multiplication circuit coupled to a computation circuit dedicated to the computation of $Y_0$, with $Y_0=(X*J_0) \mod 2^k$, $J_0$ being defined by the equation $((N*J_0)+1) \mod 2^k=0$. The computation of $Y_0$ is done according to the invention bit by bit, one clock half-cycle before the use of each bit. The invention also proposes a method for the computation of a modular operation using the circuit for the computation of $Y_0$.

Thus, there is a need to overcome the disadvantages of the prior art as discussed above.

SUMMARY OF THE INVENTION

In accordance with preferred embodiments of the present invention, as discussed below, it is intended to overcome the above-mentioned drawbacks of the prior art.

A preferred embodiment of the present invention provides an integrated circuit comprising a modular arithmetic coprocessor comprising storage means for storing and providing, in series, first and second operands A and B, a modulo N and a result S, with A as an integer encoded on $a*k$ bits, a being a non-zero integer at most equal to m, and with B, N and S being integers encoded on at most $m*k$ bits, m and k being integers greater than 1; computation means to perform modular operations according to the Montgomery method, wherein the computation means comprise a first output to provide an updated result S(i) bit by bit and a second output to give an anticipated result and wherein said coprocessor furthermore comprises a computation circuit that receives the anticipated result and produces an intermediate data element $Y_0$ that is reinjected into the computation means to produce the updated result S(i).

Preferably, the circuit to compute the data element $Y_0$ comprises a latch synchronized with the edges unused by the computation means, said latch being used to store a bit of $Y_0$; means to give zero during a first half-cycle of a clock signal and to give the bit stored by the latch during the second half-cycle of the clock signal.

According to a second preferred embodiment of the present invention, a method performs a modular operation according to the Montgomery method by the serial shifting of first and second operands A and B, a modulo N and an updated result through computation means, with A as an integer encoded on $a*k$ bits, a being a non-zero integer at most equal to m and with B, N and S being integers encoded on at most $m*k$ bits, m and k being integers greater than 1, wherein an intermediate data element, $Y_0$ is computed such that $Y_0=((S(i-1)+(A_i*B))*J_0) \mod 2^k$ in an iterative loop indexed by i, i varying from 0 to a-1, with S(i-1) corresponding to the (i-1)th updated result, S(-1) being equal to 0, $A_i$ being the ith k-bit word of A, and $J_0$ being a k-bit word resolving the equation $((J_0*N)+1) \mod 2^k=0$ wherein $Y_0$ is given by a computation circuit that computes each bit of $Y_0$ during a half-cycle of a clock period that receives the use of said each bit of $Y_0$.

Preferably, said method furthermore comprises the repetition of the following steps, i being an index varying from 0 to a-1:

the storage of a k-bit word $A_i$ corresponding to a word with a place value i of A in a first latch of k bits;

the storage of the least significant k-bit word of N and then of $Y_0$ in a second k-bit latch;

the addition in a parallel addition circuit of the words contained in the first and second latches;

the selection and supply either of the word contained in the first latch or of the word contained in the second latch or of the sum of the words contained in the first and second latches or of the word zero as a function firstly of a bit of B and secondly of a bit of $Y_0$ or a bit of N;

the successive addition, in an accumulator circuit, of the words given by the selection device for each pair of bits of B and of N, the result of each addition being added to a bit of the preceding updated result S(i-1) then offset by one bit and stored between each addition, the bit output from the accumulator during the shift corresponding to a new updated result S(i).

Other features and advantages of the preferred embodiments of the present invention will become apparent from the following detailed description. It should be understood, however, that the detailed description and specific examples, while indicating preferred embodiments of the present invention, are given by way of illustration only and various modifications may naturally be performed without deviating from the spirit of the present invention.

DESCRIPTION OF THE DRAWINGS

The invention will be understood more clearly and other particular features and advantages will appear from the following description, made with reference to the appended drawings, of which.

DETAILED DESCRIPTION OF THE PREFERRED EMBODIMENTS

Preferred embodiments of the present invention will be described in detail hereinbelow with reference to the attached drawings.

Since FIG. 1 has been described here above and gives a view of the prior art, it shall not be described in greater detail.

Figure 2:
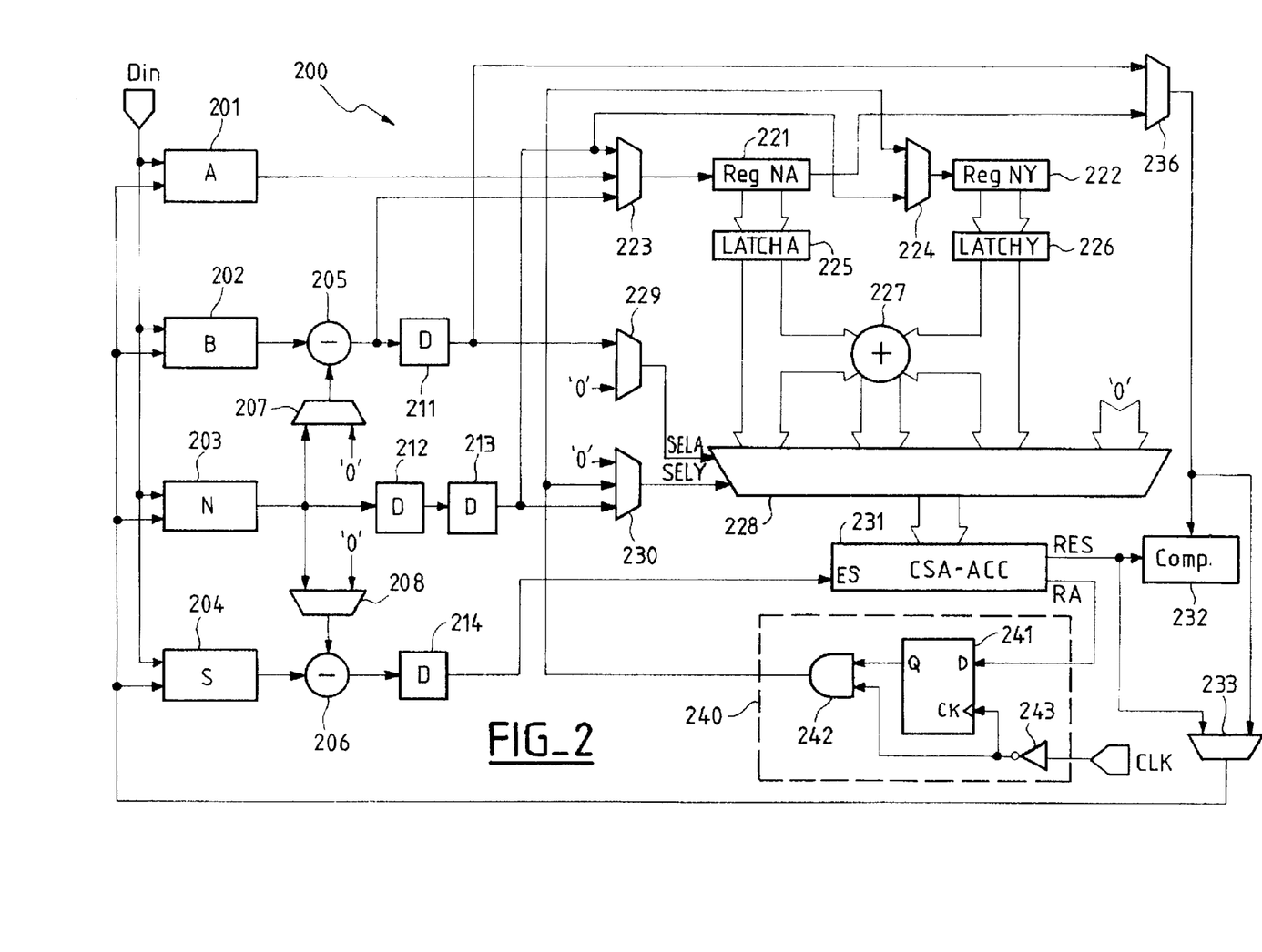
FIG. 2 shows a modular arithmetic coprocessor according to the invention.

FIG. 2 shows the modular arithmetic coprocessor 200 in a preferred embodiment. In order to avoid burdening the drawing, only the routing of the data elements has been shown in this FIG. 2. A state machine (not shown) sends the necessary control signals to the different functional elements of the coprocessor 200. The coprocessor 200 has the following elements:

First to fourth storage devices 201 to 204 respectively containing data elements A, B, N and S. The data elements A, B, N and S are data elements encoded on at most a number m of k-bit words. The storage devices 201 to 204 make it possible to furnish any k-bit word of the stored data independently. Each storage device 201 to 204 has first and second series inputs and a series type of data output. The first input of each storage device 201 to 204 is connected to an input terminal Din.

First and second series type subtraction circuits 205 and 206 having first and second inputs and a series type output. The first input of the first subtraction circuit 205 is connected to the output of the second storage device 202. The first input of the second subtraction circuit 206 is connected to the output of the fourth storage device 204.

First and second multiplexers 207 and 208 are coupled respectively to the second inputs of the first and second subtraction circuits 205 and 206. The first and second multiplexers 207 and 208 have two inputs each, one of the inputs receiving a logic "zero" and the other of the inputs being connected to the output of the third storage device 203. The association of the first and second subtraction circuits 205 and 206 with the first and second multiplexers 207 and 208 enables the subtraction of either "zero" or of the data element output from the third storage device 203 from the data elements output from the second and fourth storage devices 202 and 204.

First to fourth delay circuits 211 to 214 are used to synchronize the data elements by delaying them by one cycle of the signal of a rate-setting clock. Each of the delay circuits 211 to 214 has an input and an output, each delay circuit being for example constituted by a simple D type synchronous latch. The input of the first delay circuit 211 is connected to the output of the first subtraction circuit 205. The input of the second delay circuit 212 is connected to the output of the third storage device 203. The input of the third delay circuit 213 is connected to the output of the second delay circuit 212. The input of the fourth delay circuit 214 is connected to the output of the second subtraction circuit 206.

A first k-bit shift register 221 has a series input, a series output and a parallel output. This first register 221 is used firstly as a buffer register for the words of A and secondly as a k clock cycle delay circuit for N.

A second k-bit shift register 222 has a series input and a parallel output. The second register 222 is used as a buffer register firstly for the least significant word $N_0$ of N and secondly for the intermediate data element $Y_0$.

A third multiplexer 223 is associated with the first register 221. The third multiplexer 223 has three inputs and one output, the output being connected to the input of the first register 221. One of the inputs of the third multiplexer 223 is connected to the output of the first storage device 201. Another of the inputs of the third multiplexer is connected to the output of the first subtraction circuit 205. The last of the inputs of the third multiplexer 223 is connected to the output of the third delay circuit 213.

A fourth multiplexer 224 is associated with the second register 222. The fourth multiplexer 224 has first and second inputs and one output, the output being connected to the input of the second register 222. The first input of the fourth multiplexer 224 is connected to the output of the third delay circuit 213.

First and second k-bit latches 225 and 226 are used for the storage, during the computation, firstly of a word of A and secondly of the least significant word $N_0$ of N or the intermediate data element $Y_0$. Each of the latches 225 and 226 has one parallel input and one parallel output, the inputs of the first and second latches 225 and 226 being respectively connected to the parallel outputs of the first and second registers 221 and 222.

An addition circuit 227 having two parallel inputs and one parallel output has both its inputs connected respectively to the outputs of the first and second latches 225 and 226. The output of the addition circuit 227 thus gives the sum of the contents of the first and second latches 225 and 226.

A selection device 228 is connected to the outputs of the first and second latches 225 and 226 and to the output of the addition circuit 227 so that, at a parallel output, it can give either the contents of the first latch 225 or the contents of the second latch 226 or the sum of the contents of the first and second latches 225 and 226 or "zero". The selection device 228 furthermore has first and second selection inputs which respectively receive a first selection signal SELA and a second selection signal SELY. When the first and second signals SELA and SELY are both at a "zero" logic level, then the output of the selection device 228 gives, at its output, the number "zero" encoded on k+1 bits. When the first selection signal SELA is at a logic "one" level, and the second selection signal SELY is at a logic "zero" level, then the output of the selection device 228 gives, at its output, the contents of the first latch 225. When the first selection signal SELA is at a logic "zero" level and the second selection signal SELY is at a logic "one" level, then the output of the selection device 228 gives, at its output, the contents of the second latch 226. When the first and second signals SELA and SELY are both at a logic "one" level, then the output of the selection device 228 gives, at its output, the sum, of the contents of the first and second latches 225 and 226.

A fifth multiplexer 229, having two inputs and one output, has its output connected to the first selection input of the selection device 228. One of the inputs of the fifth multiplexer 229 is connected to the output of the first delay circuit 211. The other of the inputs of the fifth multiplexer 229 receives a logic "zero".

A sixth multiplexer 230, having first to third inputs and one output, has its output connected to the second selection input of the selection device 228. The first input of the sixth multiplexer 230 receives a logic "zero". The second input of the sixth multiplexer 230 is connected to the output of the third delay circuit 213.

An accumulator circuit 231 performs a double multiplication by the successive addition of the words output from the selection device 228. The accumulator circuit 231 has a parallel input connected to the output of the selection device 228, a series input connected to the output of the fourth delay circuit 214, a result output and an anticipated result output. At each cycle of the sequencing clock of the coprocessor 200, the accumulator circuit adds up a bit present at the series input with a word present at the parallel input and with an internal result. The new result is then shifted to become a new internal result.

A seventh multiplexer 233 has two inputs and one output. One of the inputs of the seventh multiplexer 233 is connected to the result output of the accumulator circuit 231. The output of the seventh multiplexer 233 is connected to the second inputs of the storage devices 201 to 204.

An eighth multiplexer 236 has two inputs and one output. One of the inputs of the eighth multiplexer 236 is connected to the series output of the first register 221. The other of the inputs of the eighth multiplexer 236 is connected to the series output of the first delay circuit 211. The output of the eighth multiplexer 236 is connected to the other input of the seventh multiplexer 233.

A two-input comparison circuit 232 makes a bit-by-bit comparison of the result output from the accumulator circuit 231 with the data output in series from the eighth multiplexer 236. The result of the comparison is then transmitted to a management circuit (not shown) of the coprocessor 200.

A computation circuit 240 performs the computation of the intermediate variable $Y_0$. The computation circuit 240 is constituted by a latch 241, an AND gate 242 with two inputs and an inverter 243. The latch 241 is a D type latch that has a data input, a clock input and an output. The data input of the latch 241 is connected to the anticipated result output of the accumulator 231. One of the inputs of the AND gate 242 is connected to the output of the latch 241, and the other of the inputs of the AND gate 242 is connected to the output of the inverter 243. The clock input of the latch 241 is connected to the output of the inverter 243. The input of the inverter 243 receives the clock signal CLK which synchronizes the different elements of the coprocessor 200. The output of the AND gate 242 is connected firstly to the third input of the sixth multiplexer 230 and secondly to the second input of the fourth multiplexer 224.

The principle of operation of this computation circuit 240 consists of the performance of two operations during one and the same clock cycle. The latch 241 is used to work on the edges (for example the trailing edges) of the clock signal CLK that are different from the edges (for example the leading edges) of the clock signal CLK used by the other elements of the coprocessor 200. Furthermore, the AND gate 242 has the effect of giving zero at output during a first half-cycle of the clock cycle CLK and the bit stored in the latch 241 during a second half-cycle of the clock signal CLK.

The coprocessor 200 enables the performance, by means of the selection device 228 and the accumulator 231, of a RES=LATCHA*SELA+LATCHY*SELY+ES type operation, LATCHA and LATCHY being the data elements stored in the first and second latches 225 and 226, SELA, SELY and ES being synchronized data elements that are given in series. It is thus possible to directly compute the k least significant bits of $Z=S(i-1)+(A_i*B)+(N*Y_0)$ by taking SELA=B, LATCHA=$A_i$, SELY=$Y_0$, LATCHY=$N_0$ ($N_0$ being the least significant k-bit word of N), and ES=S(i−1). Now, as is known to those skilled in the art, the k least significant bits of Z are all at zero. To compute $Y_0$, a bit at zero will therefore be given during a first half-cycle of the clock signal instead of the bit with a place value i(k>i≧0). This has the effect of computing the bit with a place value i of Z while having a zero instead of the bit with a place value i of $Y_0$. At the end of the first half-cycle, the anticipated result is stored in the latch 241 and corresponds to a bit with the place value i of $Y_0$. The next half-cycle is used for the exact recomputation of the bit with a place value i. At the end of k cycles of the clock signal CLK, $Y_0$ is computed as an integer and the computation of Z has already begun.

FIG. 2 shows a routing of data between different functional elements. The routing, shown by means of linking wires and various multiplexers, may have numerous variants. What is important is to provide for data exchanges between the different computation and storage elements. Certain elements of FIG. 2 do not correspond exactly to standard elements commonly used by those skilled in the art. FIGS. 3 to 7 specify the structure of these different elements.

Figure 3:
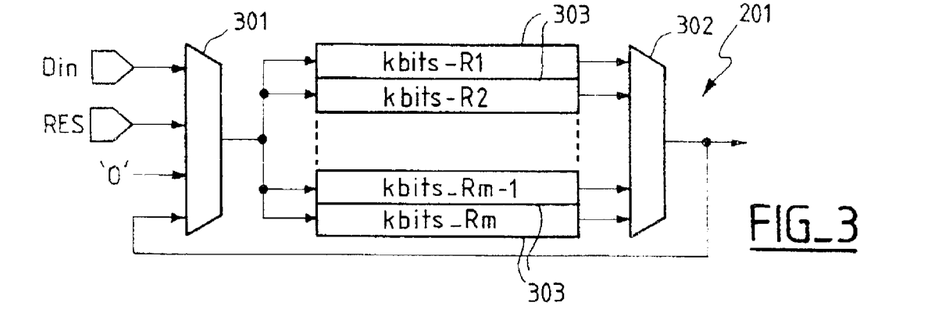
FIGS. 3 to 7 give a detailed view of the different elements of the coprocessor of FIG. 2.

FIG. 3 corresponds to one of the storage devices 201 to 204. The storage device 201 has two multiplexers 301 and 302 and first to mth shift registers 303 also referenced R1 to Rm. The multiplexer 301 has first to fourth inputs and one output. The first and second inputs of the multiplexer 301 constitute the first and second inputs of the storage device 201. The third input of the multiplexer 301 receives a logic "zero". The first to mth registers 303 are k-bit shift registers which have a series input and a series output. The inputs of the first to mth registers 303 are connected together to the output of the multiplexer 301.

The multiplexer 302 has first to mth inputs and one output. The first to mth inputs of the multiplexer 302 are respectively connected to the outputs of the first to mth registers 303. The output of the multiplexer 302 is connected to the fourth input of the multiplexer 301.

Control signals (not shown) are used to select the inputs of the multiplexers 301 and 302 and validate the shift independently in each of the registers 303. When it is sought to store an m*k bit data element in the storage device 201, said data element is stored in k-bit words in each of the registers 303. To store the data, it is enough to perform k shifts of the first register 303 and then k shifts of the second register 303 and so on and so forth until the mth register 303, the multiplexer 301 selecting the source of the data element.

To provide a data element encoded on m*k bits, it is enough to shift the registers 303 one after the other in the order of storage of the data. The looping of the output of the multiplexer 302 to the fourth input of the multiplexer 301 enables the entry, into one of the registers 303, of the k-bit word that is output simultaneously. This looping ensures the storage of the data elements making it possible to obtain several outputs of one and the same data element.

As can be seen, it is possible to make independent use of any k-bit word of a data element comprising several k-bit words. It is also possible to make a k-bit word enter one of the registers 303 while a k-bit word is output from another of the registers 303.

Figure 4:
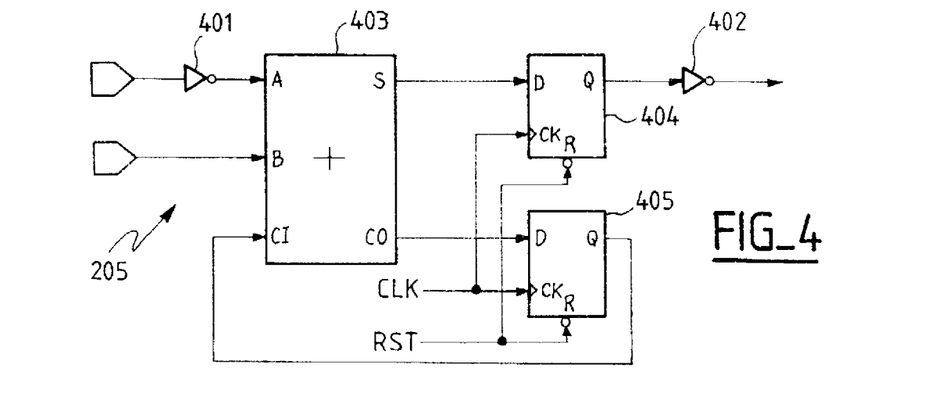

FIG. 4 shows the first (or second) subtraction circuit 205 (or 206). The subtraction circuit 205 has two inverters 401 and 402, an elementary adder and two D type storage latches 404 and 405 connected according to a prior art technique as indicated in FIG. 4.

This subtraction circuit 205 produces a systematic delay of one clock cycle on the data elements that flow through it. The second delay circuit 212 is used to compensate for the delays produced on the data elements that are output from the third storage device 203. Similarly, it is also possible to compensate for the delays at the output of the first storage device 201. However, the data elements output from the first storage device 201 do not need to be synchronized with the other data elements.

The use of the subtraction circuit 205 as shown in FIG. 4 also makes it possible to overcome the effects of the first, third and fourth delay circuits 211, 213 and 214. Indeed, the latch 404 produces an identical delay. It is enough to extract the signal at the input of the latch 404 and the inverter to obtain the next output bit. One drawback is that of not having a stable signal as soon as the active edge of the clock signal arises. For the systems working with a low clock frequency, this provides for a saving of three D type latches.

Figure 5:
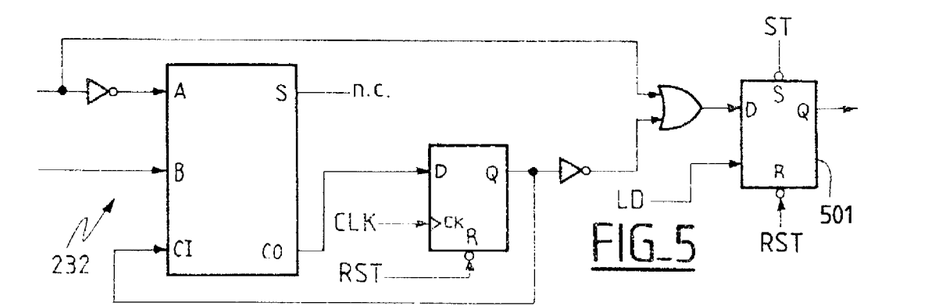

The circuit of FIG. 5 shows the comparison circuit 232 in detail. The comparison circuit 232 corresponds to a subtraction circuit on which the stored carry value and the data that reaches the first input of the subtraction circuit are extracted. This subtraction circuit is obviously simplified in the figure. The stored carry value is inverted and then entered into a logic OR circuit with the data element present on the first input. The result output from the logic OR circuit when the totality of the data elements is entered into the comparison circuit 232 makes it possible to find out which of the two data elements is greater than the other. The result is stored in a D type latch 501.

The D type latch 501 has a data input, a clock input, a setting input, a resetting input, and an output. The data input receives the data element output from the logic OR circuit, the clock input receives a loading signal LD whose leading edge corresponds to the instant at which it is sought to obtain the result of the comparison. The setting and resetting inputs receive the pre-positioning signals ST and RST to set or reset the comparison circuit 232. The output of the latch 501 is connected to a sequencing device (not shown) of the coprocessor 200.

Figure 6:
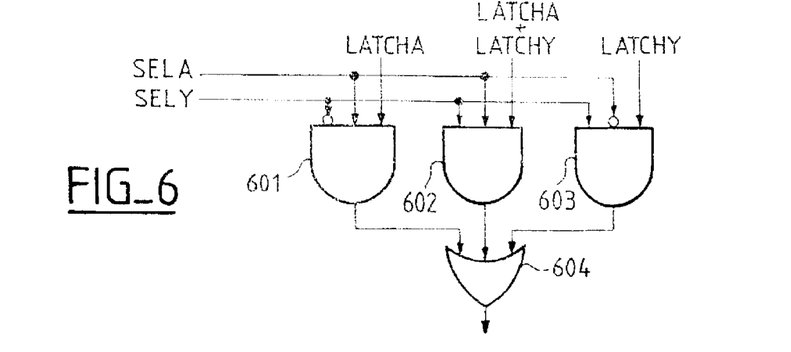

FIG. 6 shows an element of the selection device 228. The selection device has k+1 elements of this type. This element consists of three three-input AND gates 601 to 603, two AND gates 601 and 603 having an inverter input and one three-input OR gate 604. The role of this element is the same as that of a four-input multiplexer whose fourth input receives a logic "zero". In the selection device 228, the element corresponding to the most significant bit has only the central AND gate 602 because the first and second latches 224 and 225 have only k bits.

Figure 7:
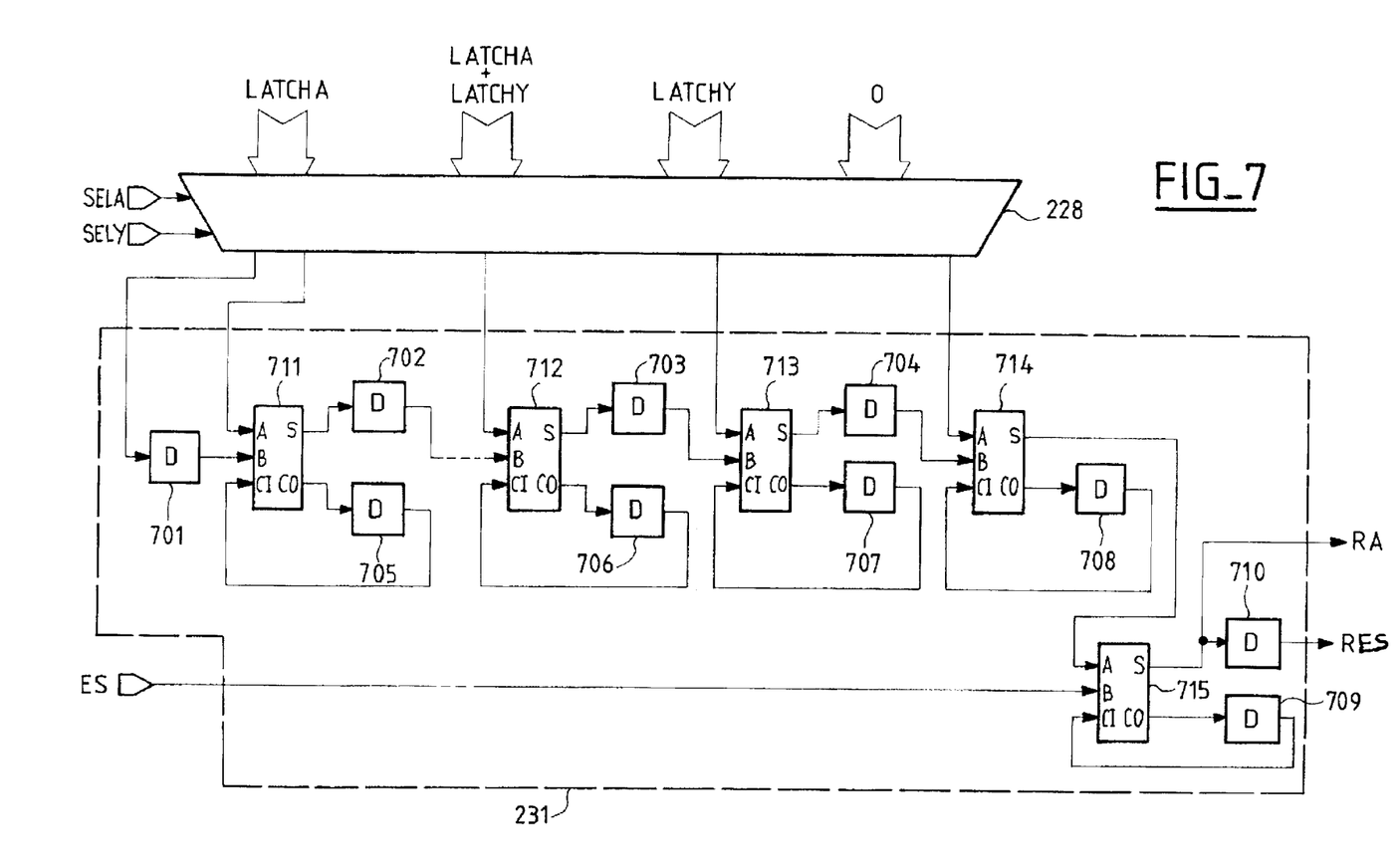

FIG. 7 shows an assembly constituted by the accumulator circuit 231 and the selection device 228. The assembly thus formed carries out two operations of multiplication with the addition of the two products and the addition of another series data element. If LATCHA is the data element present in the first latch 225, LATCHY the data element present in the second latch 226, SELA the data element arriving serially at the first selection input of the selection device 228, SELY the data element arriving serially at the second selection input of the selection device, ES the data element arriving serially at the series input of the accumulator 231 and RES the result output serially from the accumulator 231, then the following operation is performed:

$$RES=(SELY*LATCHY)+(SELA+LATCHA)+ES$$

The structure of the accumulator circuit 231 corresponds to a standard accumulator structure. Said circuit 231 comprises:

first to kth accumulation latches 701 to 704, for example D type latches, each having a data input and an output, the data input of the first latch 701 being connected to the conductor that corresponds to the most significant value (namely with the place value k) of the parallel output of the selection device 228;

first to (k+1)th carry latches 705 to 709, for example D type latches, each having a data input and an output;

a result latch 710, for example of the D type, having a data input and an output, the output of this result latch corresponding to the output of the accumulator 231;

first to (k+1)th standard adders 711 to 715 (or complete adders) each having first to third inputs, one result output, and one carry output, the first inputs of the first to kth adders 711 to 714 being connected to the selection device 228 to respectively receive the bits with place values k−1 to 0, the second inputs of the first to kth adders 711 to 714 being connected respectively to the outputs of the first to kth accumulation latches 701 to 704, the first input of the (k+1)th adder 715 being connected to the result output of the kth adder 714, the second input of the (k+1)th adder 715 corresponding to the series input of the accumulator 231 which receives the data element ES, the third inputs of the first to (k+1)th adders 711 to 715 being respectively connected to the outputs of the first to (k+1)th carry latches 705 to 709, the result outputs of the first to (k−1)th adders 711 to 713 being respectively connected to the data inputs of the second to kth accumulation latches 702 to 704, the result output of the (k+1)th adder 715 being connected to the input of the result latch 710, the result output of the (k+1th adder 715 corresponding also to anticipated result output of the accumulator 231, the carry outputs of the first to (k+1)th adders 711 to 715 being respectively connected to the data inputs of the first to (k+1th carry latches 705 to 709.

In practice, the carry, accumulation and result latches 701 to 710 also comprise clock inputs and setting inputs. All the clock inputs of said latches 701 to 710 are connected together and receive one and the same clock signal. Similarly, all the setting inputs are connected together to be reset simultaneously with each computation. These inputs are not shown in order to avoid unnecessarily burdening the drawings.

The working of the device described in this FIG. 7 is relatively simple. During each cycle of a clock signal that synchronizes the coprocessor, either LATCHA or LATCHY or LATCHA+LATCHY or zero are added up successively, with the contents of the carry latches 705 to 709 and with the arriving bit of the data element ES, to the contents of the accumulation latches 701 to 704, the word contained in the accumulation latches 701 to 704 being successively shifted so that the bit contained in the result latch 710 corresponds to the bit that is output from the accumulator 231.

Before beginning a computation, a resetting is done for all the accumulation, carry and result latches 701 to 710. Then, the double multiplication is done by simultaneous shifting of the data elements SELA, SELY and ES, at each cycle of the clock signal. The bits of SELA and SELY determine those data elements among LATCHA and LATCHY that must be accumulated (see the working of the selection device 228). When the totality of the data bits SELA and SELY have been shifted (namely after m*k clock cycles), "0" s are given (for k+1 clock cycles) instead of the data elements SELA, SELY and ES in order to output the end of the result still contained in the accumulation latches 701 to 704.

If said data elements are encoded on different numbers of bits, it is necessary to complete each data element by means of "0" s.

The anticipated output of the accumulator enables the retrieval of the least significant bit of the result before it is stored in the result latch 710 during an active edge (for example a leading edge). Thus, during a first half-cycle, it is possible to perform a first computation (possibly a false one) of which only the least significant bit is stored in the latch 241 during an edge (for example a trailing edge) that is inactive for the rest of the coprocessor 200. During a second half-cycle, a second computation may then performed and stored in the latch during the next active edge.

Now that the structural and functional description of the elements comprising the coprocessor has been made, it is necessary to explain the overall operation of the coprocessor. The following explanations will enable those skilled in the art to comprehensively synchronize the coprocessor in order to obtain the desired operations. Hereinafter, we shall use the data elements A, B and N which are non-zero integers, the N data element having uneven parity, encoded respectively on a*k, b*k and n*k bits, with a, b and n being non-zero integers smaller than m.

Elementary operation $P_{field}(A, B)_N = A*B*I \bmod N$:

A) The resetting of the coprocessor:

the data elements A, B, N respectively are loaded into the first to third storage devices 201 to 203;

the zeros are loaded into the fourth storage device 204, the data element being called S(−1);

the comparison device 232 is reset so that the last comparison indicates that N is greater than S(−1).

B) The repetition a times of the following computation loop, with i being an index varying from 0 to a−1:

B-1) A simultaneous loading is done of the ith least significant word $A_i$ of A into the first register 221 and the $N_0$ least significant word of N into the second register 222.

B-2) Then, a simultaneous loading is done of the words $A_i$ and $N_0$ respectively into the first and second latches 225 and 226.

B-3) The subtraction circuits 205 and 206, the delay circuits 211 to 214, the first register 221, all the latches 701 to 710 of the accumulator 231, and all the latches 811 to 814 and 831 to 835 of the computation circuit 240 are reset.

B-4) The words B and S(i−1) contained in the second and fourth storage devices 202 to 204 are shifted simultaneously by two bits, zeros being given on the first and second inputs of the selection device 228.

B-5) k successive shifts are made on the second and fourth storage devices 202 and 204 and on the second register 222, the output of the computation circuit 240 being connected to the input of the second register 222 by means of the multiplexer 224 and to the second selection input of the selection device 228 by means of the multiplexer 230. The data element B is given to the first selection input of the selection device 228. The data element N is given to the input of the first register 221. The series input of the accumulator 231 receives S(i−1) if the last comparison indicates that S(i−1)<N, or receives S(i−1)−N if the last comparison indicates that S(i−1)≧N (the subtraction is done in the second subtraction circuit 206). During a first half-cycle of the clock signal CLK (for example when it is in the high state), the output of the circuit 240 gives a zero, the result of which is to produce a bit of $Y_0$ on the anticipated result output of the accumulator 231, said bit of $Y_0$ being stored in the latch 241 during a transition that is inactive for the other elements of the coprocessor 200. During a second half-cycle of the clock signal CLK (corresponding for example to the low state), the output of the accumulator 231 gives the k least significant bits of $Z=S(i-1)+A_i*B+N*Y_0$ bit by bit.

B-6) The contents of the second register 222 equal to $Y_0$ are transferred into the second latch 226.

B-7) n*k successive shifts are made in the second to fourth storage devices 202 to 204 and on the first register 221. The data element B is given to the first selection input of the selection device 228. The data element N is given bit by bit firstly to the input of the first register 221 and secondly to the second selection input of the selection device 228. The series input of the accumulator 231 receives S(i−1 if the last comparison indicates that S(i−1)<N or receives S(i−1)−N if the last comparison indicates that S(i−1)≧N (the subtraction being done in the second subtraction circuit 206). The output of the accumulator 231 gives the (n−1)*k least significant bits of S(i) which are stored in the fourth storage device 204. The (n−1)*k least significant bits of S(i) are compared, in the comparison circuit 232, with the (n−1)* k least significant bits of N output from the first register 221.

B-8) k+1 successive shifts are made on the fourth storage device 204 and on the first register 221. The first and second selection inputs of the selection device 228 receive zeros to be able to provide the k most significant bits of S(i) and finish the comparison of S(i) with N. The result of the comparison is stored in the next iteration.

C) At the end of the last iteration, the result S(a−1) stored in the fourth storage device must undergo a new subtraction of N if S(a−1)>N. The subtraction is done by a simultaneous shifting of S(a−1) and N in the second subtraction circuit 206. To recover the result of the subtraction, zeros are given to the selection inputs of the selection device 228 in order to make the accumulator 231 transparent.

Those skilled in the art will see that it is possible to perform this elementary operation according to different variants. The resetting and data loading steps (steps A, B-1, B-2, B-3, B-7) may be eliminated if the coprocessor is in a configuration that corresponds to the situation obtained at the end of one of the steps.

Similarly, the synchronization steps B-4 and B-8 may be modified as a function of the delays induced by the subtraction circuits 205 and 206 and as a function of the number of delay circuits 211 to 214 used. Other steps may overlap, especially the steps relating to the transfer of data between different elements when no computation is done at the same time. It is also possible to use different active edges provided that a desynchronization of one clock half-cycle is kept between the latch 241 and the other elements of the coprocessor 200.

Modular Multiplication:

To perform a modular multiplication, it is enough to perform two elementary operations Pfield by introducing an error correction parameter H. Then, the following are performed: either $P_{field}(H, P_{field}(A, B)N)N$, or $P_{field}(A, P_{field}(H, B)N)N$, with $H=2(a+b)*k \mod N$.

Computation of $A^C \mod N$

C is taken to be an integer encoded on c bits, the most significant bit $2^{c-1}$ of which is equal to 1. It is assumed that A and N are encoded on one and the same number of bits equal to n*k bits. If A has a size smaller than N, then A is complemented with zeros in most significant bits.

a) $H=2^{2*n*k} \mod N$ is computed.

b) $R(1)=P_{field}(H, A)$ is computed and R(1) is stored in the first and second storage devices 201 and 202, the contents of the first device 201 being called A and the contents of the second device 202 being called B.

c) A loop indexed by an index i varying from 2 to c is made:

c-1) A $P_{field}(B, B)$ operation is performed, in loading the words of B instead of the words of A during the step B-1. The result is stored in the second storage device 202.

c-2) If the bit with a place value $2^{c-1}$ of C is equal to 1, then an operation $P_{field}(A, B)N$, is also performed and the result is stored in the second storage device 202.

d) "1" encoded on n*k bits is loaded into the first storage device 201.

e) A $P_{field}(1, B)_N$ operation is performed to obtain the final result.

Computation of $H=2^{(n+p)*k} \mod N$, p Being an Integer

To compute H, the elements of the coprocessor 200 are neutralized in part. The fifth multiplexer 229 is positioned to give "zeros" at its output. A data element equal to "1" encoded on k bits is loaded into the second latch 226. The sixth multiplexer 230 is positioned to connect the output of the third delay circuit 213 to the second selection input of the selection device 228. The eighth multiplexer 236 is positioned to connect the input of the comparator 232 to the output of the first delay circuit 211. The assembly resulting from these different operations of neutralization converts the coprocessor 200 into a circuit for the computation of H by successive subtractions. A circuit of this kind is described in the European patent No. 0 601 907.

While there has been illustrated and described what are presently considered to be the preferred embodiments of the present invention, it will be understood by those of ordinary skill in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. An integrated circuit comprising a modular arithmetic coprocessor comprising:

storage means to store and serially provide a first operand A and a second operand B, a modulo N and a result S, with A being an integer encoded on a*k bits, a being a non-zero integer at most equal to m, and B, N and S being integers encoded on at most m*k bits, m and k being integers greater than 1; and computation means to perform modular operations according to the Montgomery method;

wherein the computation means comprise a first output to provide an updated result S(i) bit by bit and a second output to give an anticipated result, wherein said coprocessor furthermore comprises a computation circuit that receives the anticipated result and produces an intermediate data element $Y_0$ that is reinjected into the computation means to produce the updated result S(i), and wherein the circuit to compute the data element $Y_0$ comprises:
   a latch synchronized with the edges of a clock signal that are unused by the computation means, said latch being used to store a bit of $Y_0$; and
   means to give zero during a first half-cycle of a clock signal and to give the bit stored by the latch during the second half-cycle of the clock signal.

2. An integrated circuit according to claim 1, wherein the computation means comprise a first k-bit shift register to receive firstly a k-bit word Ai of A and transmit said word in parallel to a first latch and, secondly, N in order to delay N by k cycles of a clock signal.

3. An integrated circuit according to claim 2, wherein the computation means further comprises a second k-bit shift register to receive firstly a least significant k-bit word $N_0$ of N and, secondly, the k-bit words of the intermediate data $Y_0$, and then transmit said word in parallel to a second latch.

4. An integrated circuit according to claim 3, wherein the computation means further comprises addition means to add the words contained in the first and second latch.

5. An integrated circuit according to claim 4, wherein the addition means comprises a parallel addition circuit.

6. A computer system comprising:

an integrated circuit comprising a modular arithmetic coprocessor comprising:

storage means to store and serially provide a first operand A and a second operand B, a modulo N and a result S, with A being an integer encoded on a*k bits, a being a non-zero integer at most equal to m, and B, N and S being integers encoded on at most m*k bits, m and k being integers greater than 1; and computation means to perform modular operations according to the Montgomery method;

wherein the computation means comprise a first output to provide an updated result S(i) bit by bit and a second output to give an anticipated result, wherein said coprocessor furthermore comprises a computation circuit that receives the anticipated result and produces an intermediate data element $Y_0$ that is reinjected into the computation means to produce the updated result S(i), and wherein the circuit to compute the data element $Y_0$ comprises:
   a latch synchronized with the edges of a clock signal that are unused by the computation means, said latch being used to store a bit of $Y_0$; and
   means to give zero during a first half-cycle of a clock signal and to give the bit stored by the latch during the second half-cycle of the clock signal.

7. The computer system of claim 6, wherein the computation means comprise a first k-bit shift register to receive firstly a k-bit word $A_i$ of A and transmit said word in parallel to a first latch and, secondly, N in order to delay N by k cycles of a clock signal.

8. The computer system of claim 7, wherein the computation means further comprises a second k-bit shift register to receive firstly a least significant k-bit word $N_0$ of N and, secondly, the k-bit words of the intermediate data $Y_0$, and then transmit said word in parallel to a second latch.

9. The computer system of claim 8, wherein the computation means further comprises addition means to add the words contained in the first and second latch.

10. The computer system of claim 9, wherein the addition means comprises a parallel addition circuit.

* * * * *